United States Patent
Salter et al.

(10) Patent No.: US 9,487,127 B2
(45) Date of Patent: Nov. 8, 2016

(54) PHOTOLUMINESCENT VEHICLE STEP LAMP

(71) Applicant: Ford Global Technologies, LLC, Dearborn, MI (US)

(72) Inventors: Stuart C. Salter, White Lake, MI (US); Paul Kenneth Dellock, Northville, MI (US); James J. Surman, Clinton Township, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 110 days.

(21) Appl. No.: 14/490,738

(22) Filed: Sep. 19, 2014

(65) Prior Publication Data

US 2015/0197180 A1    Jul. 16, 2015

Related U.S. Application Data (63) Continuation-in-part of application No. 14/301,635, filed on Jun. 11, 2014, which is a continuation-in-part of application No. 14/156,869, filed on Jan. 16, 2014, which is a continuation-in-part of application No. 14/086,442, filed on Nov. 21, 2013.

(51) Int. Cl.
| | |
|---|---|
| *B60Q 1/24* | (2006.01) |
| *B60Q 1/32* | (2006.01) |
| *F21V 9/10* | (2006.01) |
| *F21S 8/10* | (2006.01) |
| *G09F 13/08* | (2006.01) |
| *G09F 13/04* | (2006.01) |

(52) U.S. Cl.
CPC ............ *B60Q 1/323* (2013.01); *F21S 48/214* (2013.01); *F21V 9/10* (2013.01); *G09F 13/08* (2013.01); *G09F 2013/044* (2013.01)

(58) Field of Classification Search
CPC .. B60Q 1/323; G09F 13/08; G09F 2013/044
USPC .................. 362/487, 495, 510–511, 521
See application file for complete search history.

(56) References Cited

U.S. PATENT DOCUMENTS

| | | | |
|---|---|---|---|
| 5,618,096 | A | 4/1997 | Parker et al. |
| 5,709,453 | A | 1/1998 | Krent et al. |

(Continued)

FOREIGN PATENT DOCUMENTS

| | | |
|---|---|---|
| CN | 201169230 Y | 12/2008 |
| CN | 101337492 A | 1/2009 |

(Continued)

*Primary Examiner* — Jason Moon Han
(74) *Attorney, Agent, or Firm* — Jason Rogers; Price Heneveld LLP (57) ABSTRACT

An illumination apparatus for a vehicle is disclosed. The illumination apparatus comprises a photoluminescent portion disposed on a step portion and a first light source. The first light source is configured to excite the photoluminescent portion in a back-lit configuration. The illumination apparatus further comprises a lighting controller in communication with the first light source. The lighting controller is configured to activate the first light source to illuminate the photoluminescent portion by exciting a photoluminescent material by emitting a first wavelength of light. In response to receiving the first wavelength, the photoluminescent material is configured to become excited to illuminate at least a portion of the step portion.

20 Claims, 5 Drawing Sheets

(56) References Cited

U.S. PATENT DOCUMENTS

| | | |
|---|---|---|
| 5,848,837 A | 12/1998 | Gustafson |
| 5,915,830 A | 6/1999 | Dickson et al. |
| 5,939,979 A * | 8/1999 | Lee .................. B60Q 1/26 340/468 |
| 6,082,870 A | 7/2000 | George |
| 6,117,362 A | 9/2000 | Yen et al. |
| 6,244,734 B1 | 6/2001 | Hulse |
| 6,466,128 B1 * | 10/2002 | Pan .................. B60Q 1/323 340/332 |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,134,773 B2 | 11/2006 | Tufte |
| 7,161,472 B2 | 1/2007 | Strumolo et al. |
| 7,213,923 B2 | 5/2007 | Liu et al. |
| 7,264,366 B2 | 9/2007 | Hulse |
| 7,264,367 B2 | 9/2007 | Hulse |
| 7,441,914 B2 | 10/2008 | Palmer et al. |
| 7,621,546 B2 * | 11/2009 | Ross .................. B60R 3/02 280/163 |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,773,012 B2 | 7/2014 | Ryu et al. |
| 8,846,184 B2 | 9/2014 | Agrawal et al. |
| 8,952,341 B2 | 2/2015 | Kingsley et al. |
| 9,057,021 B2 | 6/2015 | Kingsley et al. |
| 9,065,447 B2 | 6/2015 | Buttolo et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0027976 A1 | 1/2013 | Robbins et al. |
| 2013/0335994 A1 | 12/2013 | Mulder et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0138789 A1 | 5/2015 | Singer et al. |
| 2015/0267881 A1 | 9/2015 | Salter et al. |
| 2016/0016506 A1 | 1/2016 | Collins et al. |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2014068440 A1 | 5/2014 |

* cited by examiner

PHOTOLUMINESCENT VEHICLE STEP LAMP

CROSS-REFERENCE TO RELATED APPLICATIONS

This application is a continuation-in-part of U.S. patent application Ser. No. 14/301,635, filed Jun. 11, 2014, and entitled "PHOTOLUMINESCENT VEHICLE READING LAMP," which is a continuation-in-part of U.S. patent application Ser. No. 14/156,869, filed on Jan. 16, 2014, entitled "VEHICLE DOME LIGHTING SYSTEM WITH PHOTOLUMINESCENT STRUCTURE," which is a continuation-in-part of U.S. patent application Ser. No. 14/086,442, filed Nov. 21, 2013, and entitled "VEHICLE LIGHTING SYSTEM WITH PHOTOLUMINESCENT STRUCTURE." The aforementioned related applications are hereby incorporated by reference in their entirety.

FIELD OF THE INVENTION

The present invention generally relates to vehicle lighting systems, and more particularly, to a lighting apparatus for a vehicle bin employing photoluminescent structures.

BACKGROUND OF THE INVENTION

Illumination arising from photoluminescent materials offers a unique and attractive viewing experience. It is therefore desired to incorporate such photoluminescent materials in portions of vehicles to provide ambient and task lighting.

SUMMARY OF THE INVENTION

According to one aspect of the present invention, an illumination apparatus for a vehicle is disclosed. The illumination apparatus comprises a photoluminescent portion disposed on a step portion and a first light source. The first light source is configured to excite the photoluminescent portion in a back-lit configuration. The illumination apparatus further comprises a lighting controller in communication with the first light source. The lighting controller is configured to selectively activate the first light source to illuminate the photoluminescent portion by exciting a photoluminescent material by emitting a first wavelength of light. In response to receiving the first wavelength, the photoluminescent material is configured to become excited to illuminate at least a portion of the step portion.

According to another aspect of the present invention, an illumination apparatus for a vehicle is disclosed. The illumination apparatus comprises a step portion comprising a step surface and a side portion. An illumination device extends longitudinally along the side portion. The lighting apparatus further comprises a controller configured to activate a first light source and a second light source. In a first state, the controller is configured to activate the first light source to illuminate at least portion of the step surface, and in a second state, the controller is configured to illuminate the second light source to illuminate a ground surface proximate an entry area of the vehicle.

According to yet another aspect of the present invention, an illumination apparatus for a vehicle is disclosed. The illumination apparatus comprises a step portion comprising a step surface and a side portion. A first photoluminescent portion is disposed on an inner surface of and extends along a longitudinal dimension of the side portion. The illumination apparatus further comprises a first light source configured to excite the first photoluminescent portion to emit a first wavelength. A lighting controller is in communication with the light source and operable to selectively activate the light source to illuminate at least a portion of the step portion.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The terms first, second, third, etc. as utilized herein may provide designations in reference to the figures for clarify. For example, a first portion and a second portion may be referred to in some implementations and only a second portion may be referred to in some additional implementations. Such designations may serve to demonstrate exemplary arrangements and compositions and should not be considered to designate a specific number of elements or essential components of any specific implementation of the disclosure, unless clearly specified otherwise. These designations, therefore, should be considered to provide clarity in reference to various possible implementations of the disclosure which may be combined in various combinations and/or individually utilized to clearly reference various elements of the disclosure.

Vehicle steps or step portions, often referred to as running boards, may be utilized on vehicles to assist entering passengers. Though running boards are intended to assist passengers, they can sometimes be obscured due to dark ambient lighting conditions. In such conditions, a passenger may miss the step portion which may result in injury. The disclosure provides for a lighting apparatus configured to illuminate a portion of a running board. In this way, a step portion may be safely utilized and may also be illuminated to enhance the appearance of the vehicle.

Figure 1:
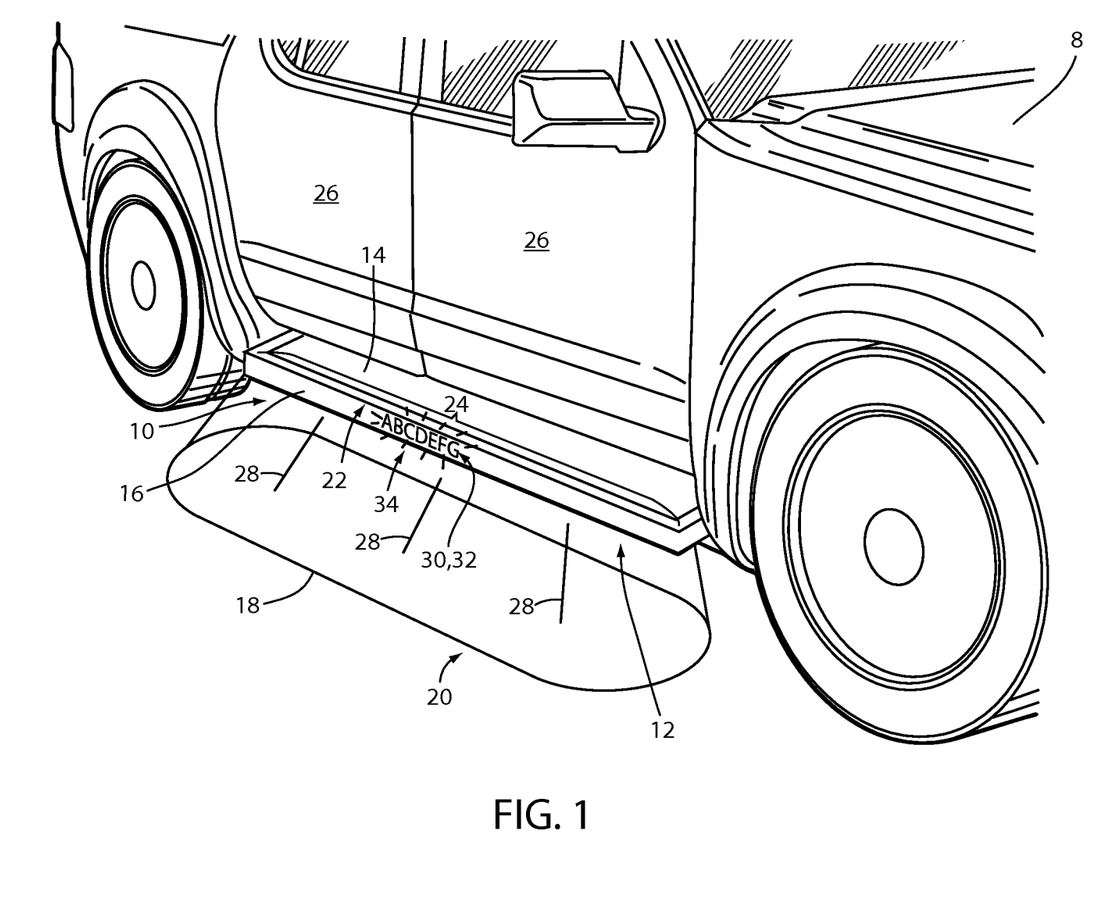
FIG. 1 is a perspective view of a step portion of a vehicle comprising a lighting apparatus.

Referring to FIG. 1, a perspective view of a vehicle 8 comprising a step portion 10 is shown. The step portion 10 may comprise a lighting apparatus 12. In various implementations, the lighting apparatus 12 may be operable to illuminate a step surface 14 and/or a side portion 16 of the step portion 10. The lighting apparatus 12 may also be configured to illuminate a portion of a ground surface 18 proximate an entry area 20 of the vehicle 8. Each of the various implementations discussed herein may be configured to generate light by utilizing photoluminescent materials. By illuminating one or more portions of the step portion 10, the disclosure may provide for an enhanced appearance of the vehicle 8 while also providing valuable safety features.

In some implementations, a first photoluminescent portion 22 may be disposed on and/or dispersed in the side portion 16 of the step portion 10. The first photoluminescent portion 22 may extend substantially along a longitudinal direction 24 of the step portion 10. The step portion 10 may extend substantially coextensive to at least one passenger door 26 of the vehicle 8. In this configuration, the lighting apparatus 12 may substantially illuminate the step portion 10.

In order to illuminate the first photoluminescent portion 22, at least one light source may be disposed behind the side portion 16 and beneath the step surface 14. The at least one light source may be selectively activated by a lighting controller of the vehicle 8 in response to a vehicle status. Upon activation, the at least one light source may emit an excitation emission or a first emission directed toward the first photoluminescent portion 22. In some implementations, the at least one light source may correspond to a first light source and a second light source configured to emit a first emission and a second emission, respectively. The first light source and the second light source are discussed in further detail in reference to FIGS. 4, 5, and 6.

The first light source and the second light source may be configured to emit similar wavelengths of light corresponding to the first emission and the second emission, respectively. In some implementations, the first light source may be configured to emit the first emission at a different intensity and direction relative to the second emission emitted from a second light source. In such implementations, the first emission and the second emission may output approximately the first wavelength as discussed herein. In response to receiving the first wavelength, the first photoluminescent portion 22 may become excited and emit a third emission 28.

The first photoluminescent portion 22 may be configured to convert the first wavelength received from the first and/or second light source to the third emission 28 comprising at least a second wavelength. The first photoluminescent portion 22 may comprise at least one photoluminescent material configured to convert the first wavelength to at least the second wavelength. The second wavelength may be longer than the first wavelength and correspond to a different color of light than the first wavelength. The various implementations described herein provide for a variety of configurations of a lighting apparatus configured to illuminate at least a portion of a step portion. In some implementations, the lighting apparatus 12 may provide for utility lighting and/or ambient lighting to enhance an appearance of the vehicle 8.

In some implementations, a graphic 30 may be disposed on the side portion 16. The graphic 30 may comprise any form of design, symbols, and/or combinations thereof. In some implementations, the graphic 30 may be configured to form a mask create an outline of the graphic 30 illuminated by the first photoluminescent portion 22. In this way, the graphic 30 may be displayed in a back-lit configuration to enhance the appearance of the graphic.

In some implementations, the graphic 30 may be correspond to a second photoluminescent portion 32 that may be disposed on or molded into the side portion 16. The second photoluminescent portion 32 may receive the first wavelength from the at least one light source similar to the first photoluminescent portion 22. In response to receiving the first wavelength from the at least one light source, the second photoluminescent portion 32 may become excited and emit a fourth emission 34 of light illuminating the graphic 30. The fourth emission 34 may comprise a third wavelength of light. The third wavelength of light may be different from the second wavelength such that the graphic 30 is output as a different color of light than the first emission 28.

Various systems and devices in communication with the lighting controller may be utilized to automatically or manually activate and/or adjust the light emitted as the first wavelength from the at least one light source. An intensity or illumination level of the light source may be adjusted in response to an ambient light condition, presence detection, or any form of sensory interface. The light source may also be illuminated selectively in various vehicle states. For example, the light source may be activated in response to an ignition event, a locking, unlocking actuation, a gear selection, emergency brake actuation, etc. In some implementations, the light source may also be configured to illuminate in response to a presence or proximity detection of a vehicle key or key fob, and/or a signal from a remote keyless entry device.

The various implementations of the lighting apparatus 12 may provide for ambient lighting of the step portion 10 of the vehicle 8. The light generated by the first photoluminescent portion 22 may be configured to emit wavelengths of light corresponding to a wide range of colors of light emitted from the step surface 14, the side portion 16, and to illuminate the entry area 20 of the vehicle. The various embodiments disclosed herein provide a novel approach for providing ambient light for step portion or running board of a vehicle.

Figure 2A:
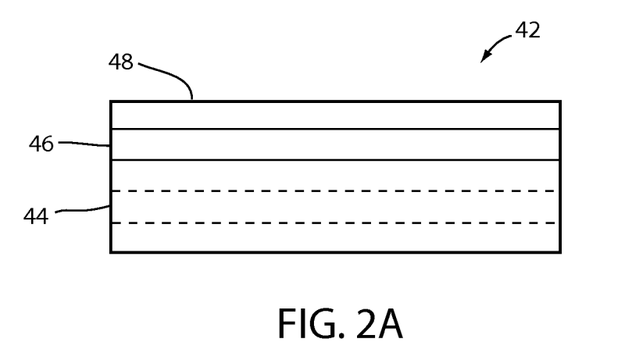
FIG. 2A illustrates a photoluminescent structure rendered as a coating.
Figure 2B:
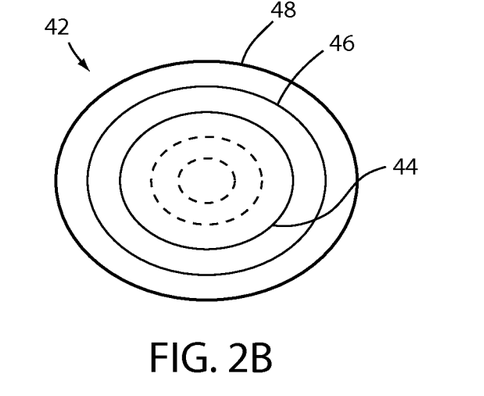
FIG. 2B illustrates the photoluminescent structure rendered as a discrete particle.
Figure 2C:
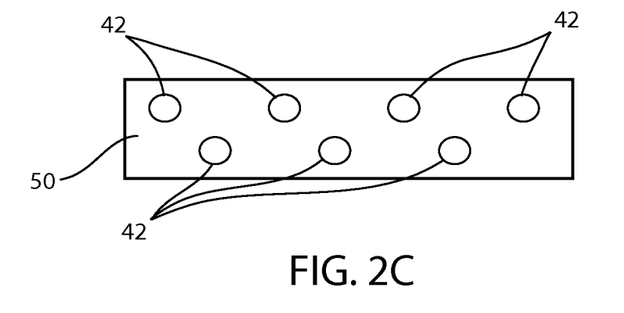
FIG. 2C illustrates a plurality photoluminescent structures rendered as discrete particles and incorporated into a separate structure.

Referring to FIGS. 2A-2C, a photoluminescent structure 42 is generally shown rendered as a coating (e.g. a film) capable of being applied to a vehicle fixture or surface, a discrete particle capable of being implanted in a vehicle fixture, and a plurality of discrete particles incorporated into a separate structure capable of being applied to a vehicle fixture, respectively. The photoluminescent structure 42 may correspond to the first photoluminescent portion 22 and the second photoluminescent portion 32 as discussed herein. At the most basic level, the photoluminescent structure 42 includes an energy conversion layer 44 that may be provided as a single layer or a multilayer structure, as shown through broken lines in FIGS. 2A and 2B.

The energy conversion layer 44 may include one or more photoluminescent materials having energy converting elements selected from a phosphorescent and/or a fluorescent material. The photoluminescent material may be formulated to convert an inputted electromagnetic radiation into an outputted electromagnetic radiation generally having a longer wavelength and expressing a color that is not characteristic of the inputted electromagnetic radiation. The difference in wavelength between the inputted and outputted electromagnetic radiations is referred to as a Stokes shift and serves as the principle driving mechanism for an energy conversion process corresponding to a change in wavelength of light, often referred to as down conversion. In the various implementations discussed herein, at least one of the wavelengths of light (e.g. the first wavelength, etc.) correspond to electromagnetic radiation utilized in the conversion process.

Each of the photoluminescent portions may comprise at least one photoluminescent structure 42 comprising an energy conversion layer (e.g. energy conversion layer 44). The energy conversion layer 44 may be prepared by dispersing the photoluminescent material in a polymer matrix 50 to form a homogenous mixture using a variety of methods as shown in FIG. 2C. Such methods may include preparing the energy conversion layer 44 from a formulation in a liquid carrier medium and coating the energy conversion layer 44 to a desired planar and/or non-planar substrate of a vehicle fixture or surface. The energy conversion layer 44 coating may be deposited on a vehicle fixture or surface by painting, screen printing, spraying, slot coating, dip coating, roller coating, and bar coating. Additionally, the energy conversion layer 44 may be prepared by methods that do not utilize a liquid carrier medium.

For example, a solid state solution (e.g. a homogenous mixture in a dry state) of one or more photoluminescent materials may be incorporated in a polymer matrix 50 to provide the energy conversion layer 44. The polymer matrix 50 may be formed by extrusion, injection molding, compression molding, calendaring, thermoforming, etc. In instances where one or more energy conversion layers 44 are rendered as particles, the single or multi-layered energy conversion layers 44 may be implanted into a vehicle fixture or panel. When the energy conversion layer 44 includes a multilayer formulation, each layer may be sequentially coated. Additionally, the layers can be separately prepared and later laminated or embossed together to form an integral layer. The layers may also be coextruded to prepare an integrated multi-layered energy conversion structure. For clarity, the polymer matrix 50 comprising photoluminescent material may be referred to as the energy conversion layer 44 hereinafter to demonstrate that each may be similarly utilized to convert the first wavelength of light to at least a second wavelength.

Referring back to FIGS. 2A and 2B, the photoluminescent structure 42 may optionally include at least one stability layer 46 to protect the photoluminescent material contained within the energy conversion layer 44 from photolytic and thermal degradation. The stability layer 46 may be configured as a separate layer optically coupled and adhered to the energy conversion layer 44. The stability layer 46 may also be integrated with the energy conversion layer 44. The photoluminescent structure 42 may also optionally include a protective layer 48 optically coupled and adhered to the stability layer 46 or any layer or coating to protect the photoluminescent structure 42 from physical and chemical damage arising from environmental exposure.

The stability layer 46 and/or the protective layer 48 may be combined with the energy conversion layer 44 to form an integrated photoluminescent structure 42 through sequential coating or printing of each layer, and/or by sequential lamination or embossing. Alternatively, several layers may be combined by sequential coating, lamination, or embossing to form a substructure. The substructure may then be laminated or embossed to form the integrated photoluminescent structure 42. Once formed, the photoluminescent structure 42 may be applied to a chosen vehicle fixture or surface.

In some implementations, the photoluminescent structure 42 may be incorporated into a vehicle fixture as one or more discrete particles as shown in FIG. 2C. The photoluminescent structure 42 may also be provided as one or more discrete multi-layered particles dispersed in a polymer formulation that is subsequently applied to a vehicle fixture or panel as a contiguous structure. Additional information regarding the construction of photoluminescent structures to be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

Figure 3:
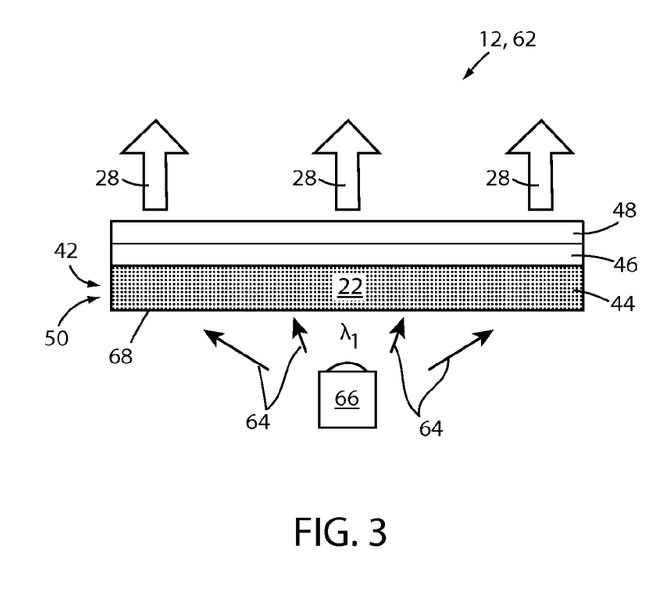
FIG. 3 is schematic view of back-lit configuration of a lighting apparatus configured to convert a first wavelength of light to at least a second wavelength.

Referring to FIG. 3, the lighting apparatus 12 is generally shown according to a first back-lit configuration 62. The first back-lit configuration 62 may demonstrate an exemplary implementation corresponding to the conversion of the first emission 64 from the at least one light source 66 to the third emission 28 as discussed in reference to FIG. 1. The third emission 28 may correspond to the light emitted from the first photoluminescent portion 22 disposed on the side portion 16 of the step portion 10. In this configuration, the first emission 64 emitted from the light source 66 is converted to the third emission 28 by the energy conversion layer 44 of the first photoluminescent portion 22. Though the third emission 28 is discussed in reference to FIG. 3, the fourth emission 34 corresponding to the second photoluminescent portion 32 may comprise a similar photoluminescent structure 42 and energy conversion layer 44 as discussed herein. A further detailed description corresponding to an exemplary implementation of the second photoluminescent portion 32 is discussed in reference to FIG. 4.

The first emission 64 comprises a first wavelength $\lambda_1$, and the third emission 28 comprises at least a second wavelength $\lambda_2$. The lighting apparatus 12 includes the photoluminescent structure 42 which may be rendered as a coating and applied to a substrate 68, panel, or surface of the vehicle 8, for example a surface of the side portion 18. The photoluminescent material may also be dispersed in the polymer matrix 50 corresponding to the energy conversion layer 44 and utilized to form a portion or layer of the side portion 18. In some implementations, the energy conversion layer 44 may further include the stability layer 46 and/or the protective layer 48.

In response to the at least one light source 66 being activated, the first emission 64 may be emitted from the first light source 66. In response to the first emission 64 being received by the energy conversion layer 44, the first photoluminescent portion 22 may convert the first emission 64 having the first wavelength $\lambda_1$ to the third emission 28 having the second wavelength $\lambda_2$. The third emission 28 may comprise a plurality of wavelengths configured to emit any color of light from the first photoluminescent portion 22.

By controlling the color of the third emission 28, the interior cavity 24 of the storage bin 10 may be illuminated in a variety of colors to suit an aesthetic appearance of the vehicle 8.

In various implementations, the lighting apparatus 12 comprises at least one photoluminescent material incorporated in the energy conversion layer 44 and is configured to convert the first emission 64 at the first wavelength $\lambda_1$ to the third emission 28 having at least the second wavelength. In order to generate a plurality of wavelengths of the third emission 28, the energy conversion layer 44 may comprise a red-emitting photoluminescent material, a green-emitting photoluminescent material, and/or a blue-emitting photoluminescent material dispersed therein. The red, green, and blue-emitting photoluminescent materials may be combined to generate a wide variety of colors of light for the third emission 28. For example, the red, green, and blue-emitting photoluminescent materials may be utilized in a variety of proportions and combinations to control a color of light of the interior cavity 24 of the storage bin 10.

Each of the photoluminescent materials may vary in output intensity, output wavelength, and peak absorption wavelengths based on a particular photochemical structure and combinations of photochemical structures utilized in the energy conversion layer 44. As an example, the third emission 28 may be changed by adjusting the wavelength of the first emission 64 to activate photoluminescent materials in the energy conversion layer 44 at different intensities to alter the color of the third emission 28. In addition to, or alternatively to the red, green, and blue-emitting photoluminescent materials, other photoluminescent materials may be utilized alone and in various combinations to generate the third emission 28 in a wide variety of colors. In this way, the lighting apparatus 12 may be configured for a variety of applications to provide a desired lighting effect for the vehicle.

The at least one light source 66 may also be referred to as an excitation source and is operable to emit at least the first emission 64. The light source 66 may comprise any form of light source, for example halogen lighting, fluorescent lighting, light emitting diodes (LEDs), organic LEDs (OLEDs), polymer LEDs (PLEDs), solid state lighting or any other form of lighting configured to output the first emission 64. The first emission 64 from the at least one light source 66 may be configured such that the first wavelength $\lambda_1$ corresponds to at least one absorption wavelength of the one or more photoluminescent materials of the energy conversion layer 44. In response to receiving the light at the first wavelength $\lambda_1$, the energy conversion layer 44 may become excited and output the one or more output wavelengths corresponding to the third emission 28. The first emission 64 provides an excitation source for the energy conversion layer 44 by targeting absorption wavelengths of the various photoluminescent materials utilized therein. As such, the lighting apparatus 12 may be configured to control the third emission 28 to generate a desired light intensity and color.

In an exemplary implementation, the light source 66 comprises at least one LED configured to emit the first wavelength $\lambda_1$ which corresponds to a blue spectral color range. The blue spectral color range comprises a range of wavelengths generally expressed as blue light (~440-500 nm). In some implementations, the first wavelength $\lambda_1$ may comprise wavelengths in an ultraviolet or near ultraviolet color range (~250-450 nm). In an exemplary implementation, the first wavelength $\lambda_1$ may be approximately equal to 470 nm. In general, the first wavelength $\lambda_1$ may be approximately less than 500 nm such that the first emission 64 of the light is not significantly visible relative to the third emission 28 and the fourth emission 34.

The blue spectral color range and shorter wavelengths may be utilized as an excitation source for the lighting apparatus 12. By utilizing shorter wavelengths for the first wavelength $\lambda_1$, and converting the first wavelength with the conversion layer 44 to at least one longer wavelength, the lighting apparatus 12 may create a visual effect of light originating from the photoluminescent structure 42 of the photoluminescent portions discussed herein. In this configuration, light is emitted from the photoluminescent structure 42 (e.g. the first photoluminescent portion 22 and the second photoluminescent portion 32) from locations of the vehicle that may be inaccessible or costly to add conventional light sources requiring electrical connections.

Each emission color, wavelength or combination of wavelengths of each of the emissions may correspond to significantly different spectral color ranges. Some wavelengths may comprise a plurality of wavelengths that may correspond to the excitation of a red-emitting photoluminescent material having a wavelength of approximately 620-750 nm. Some wavelengths may correspond to the excitation of a green emitting photoluminescent material having a wavelength of approximately 526-606 nm. Some wavelengths may also correspond to a blue or blue green emitting photo luminescent material having a wavelength longer than the first wavelength $\lambda_1$ and approximately 430-525 nm. The wavelengths may be utilized to generate a wide variety of colors of light emitted from the first photoluminescent portion 22 and the second photoluminescent portion 32 and any other photoluminescent portions discussed herein.

Figure 4:
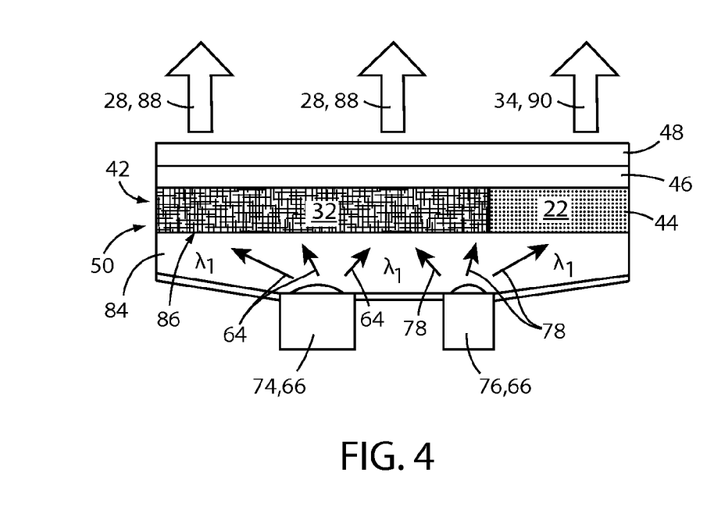
FIG. 4 is schematic view of back-lit configuration of a lighting apparatus configured to convert a first wavelength of light to at least a second wavelength.

Referring to FIG. 4, an implementation of the lighting apparatus 12 is generally shown according to a back-lit configuration 72. In the back-lit configuration 72, the at least one light source 66 may correspond to the first light source 74 and the second light source 76. In this configuration, the first emission 64 and the second emission 78 may be correspond to excitation emissions comprising approximately the first wavelength $\lambda_1$ of light. The first photoluminescent portion 22 may be configured to convert the first wavelength $\lambda_1$ from the first light source 74 and/or the second light source 76 to the third emission 28. Additionally, the second photoluminescent portion 32 may be configured to convert the first wavelength $\lambda_1$ from the first light source 74 and/or the second light source 76 to the fourth emission 34. In this configuration, the light apparatus 12 may be configured to excite substantially an upper portion and a lower portion of a light emitting surface of the lighting apparatus (e.g. the side portion 18).

The first light source 74 and the second light source 76 may be configured to emit approximately the first wavelength $\lambda_1$ of light at first intensity and a second intensity, respectively. The second intensity may be greater than the first intensity such that the second light source emits a greater quantity of light directed toward the first photoluminescent portion 22 and the second photoluminescent portion 32. Though referred to herein as the first intensity and second intensity, each of the light sources may similarly correspond to any forms of light sources that may output different quantities of light relative to each other. In this configuration, the lighting apparatus 12 may be operable to illuminate at least one of the first photoluminescent portion 22 and the second photoluminescent portion 32 at a first intensity and a second intensity in response to a state of the vehicle 8.

The lighting apparatus 12 may comprise an optic device 84 configured to direct the light at the first wavelength $\lambda_1$ substantially along the first photoluminescent portion 22 and second photoluminescent portion 32. Each of the first photoluminescent portion 22 and the second photoluminescent portion 32 may comprise the photoluminescent structure 42 in the energy conversion layer 44 disposed as a coating or polymer matrix 50 proximate an exterior surface 86 of the optic device 84. While the structure and construction of the each of the photoluminescent portions 22 and 32 may be similar, each portion may comprise different photoluminescent materials configured to illuminate the step portion 10 in a first output color 88 and a second output color 90. The first output color 88 may correspond to the third emission 28 and the second output color 90 may correspond to the fourth emission 34. In this configuration, the side portion 16 may be illuminated by the third emission 22 and the fourth emission 34 to provide ambient lighting at least two colors.

The optic device 84 may be composed of any material configured to transmit the light at the first wavelength $\lambda_1$ substantially across the extents of the exterior surface 86 abutting the second photoluminescent portion 32. In some implementations, the optic device 84 may comprise a polymeric material configured to provide a refractive index such that the light at the first wavelength is transmitted from each of the first light source 74 and the second light source 76 to the exterior surface 86 consistently along the longitudinal direction 24 of the step portion 10. In some implementations, the optic device may be configured to transmit the first emission 64 and the second emission 78 significantly toward a particular photoluminescent portion. For example, the first emission 64 may be configured to illuminate the second photoluminescent portion 32 substantially independent of the first photoluminescent portion 22. In this way, the lighting apparatus 12 may significantly illuminate each of the photoluminescent portions independently.

The back-lit configuration 72 may comprise the energy conversion layer 44 disposed in each of the first photoluminescent portion 22 and the second photoluminescent portion 32. The energy conversion layer 44 may be configured to be excited in response to receiving the first wavelength $\lambda_1$ from the first emission 64 and/or the second emission 78. In response to the excitation, the third emission 28 and the fourth emission 34 may be output as one or more output wavelengths of light. The wavelengths of light corresponding to the third emission 28 and the fourth emission 34 may be configured to emit the first color 88 of light and the second color 90 of light, respectively. The color of the light corresponding to the third emission 28 and the fourth emission 34 may be controlled by utilizing a particular photoluminescent materials or combinations thereof as discussed herein.

Figure 5:
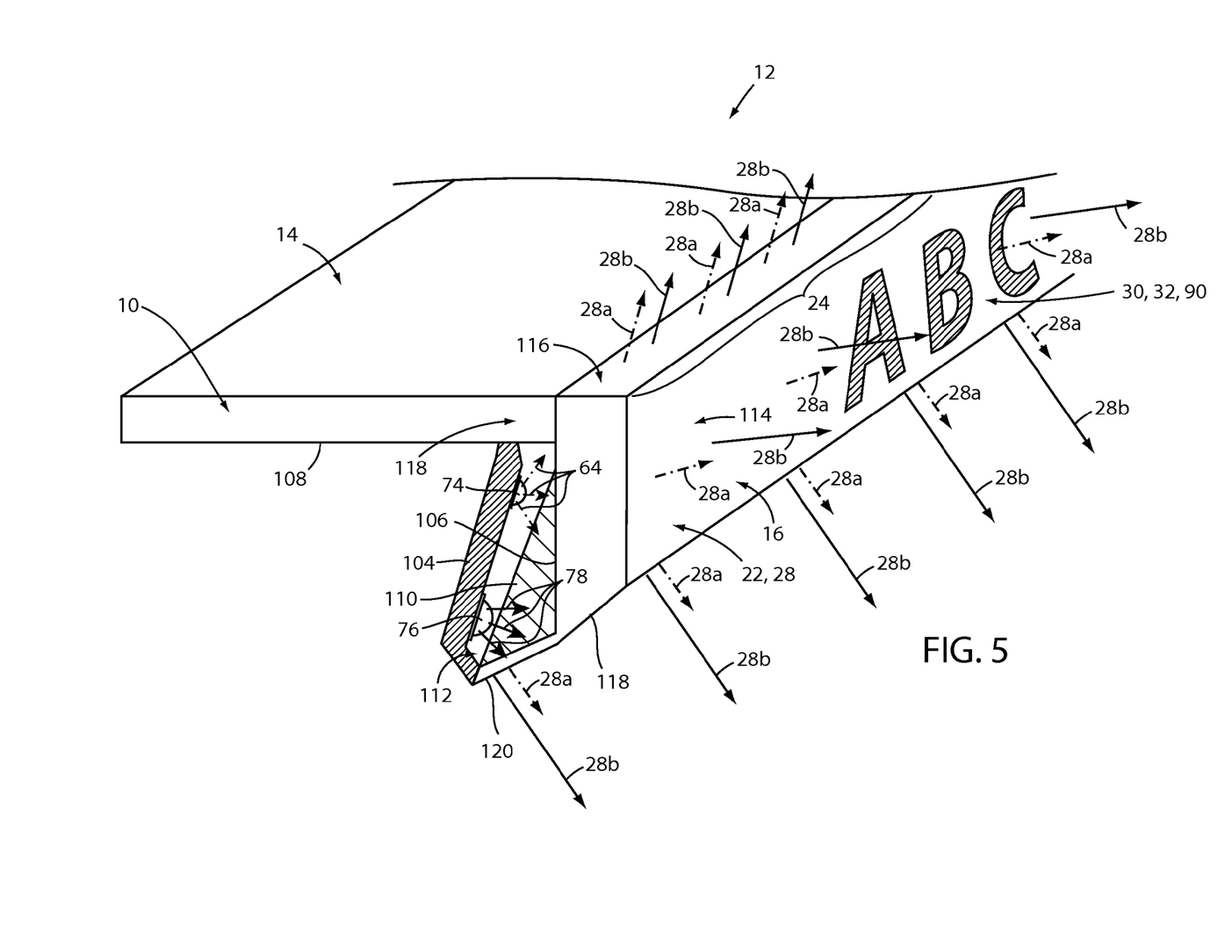
FIG. 5 is a perspective cross-sectional view of a step portion of a vehicle comprising a lighting apparatus.

Referring now FIG. 5, a perspective cross-sectional view of the step portion 10 or running board is shown demonstrating the lighting apparatus 12. The step portion 10 is shown comprising the step surface 14 and the side portion 16. The first photoluminescent portion 22 may correspond to a photoluminescent structure disposed in a panel forming the side portion 16. The first light source 74 and the second light source 76 may be disposed in a sealed housing 104. The sealed housing 104 may be mounted proximate an inner surface 106 of the side portion 16 and a bottom surface 108 of the step portion 10. The sealed housing 104 may be configured to protect the light sources 74 and 76 from wear and/or damage that may result from environmental exposure.

An optic device 110 may be disposed within or proximate to the sealed housing 104. The optic device 110 may be configured to receive the first emission 64 and the second emission 78 from each of the first light source 74 and the second light source 76, respectively. The optic device 110 may be configured to diffuse and spread the first emission 64 and the second emission 78 substantially along the step portion 10 in the longitudinal direction 24. In this configuration, the first emission 64 and the second emission 78 may be dispersed substantially along the step portion 10, and the longitudinal direction 24 to limit a number of light sources required to illuminate the step portion 10.

The optic device 110 may further have a profile shape 112 configured to direct the first emission 64 substantially toward the side portion 16 and the step surface 14. The profile shape 112 may be configured to direct the second emission 78 substantially toward the side portion 16. Additionally, the first light source 74 may be oriented above the second light source 76 to further direct the first emission 64 and the second emission 78 substantially in the directions discussed herein. In this configuration, the lighting apparatus 12 may be configured to selectively activate each of the first light source 74 and the second light source 76 to illuminate an upper portion and a lower portion of first photoluminescent portion 22, respectively.

In response to the activation of the first light source 74, the first emission 64 may be emitted into the optic device 110 and substantially through an at least partially light transmissive material of the side portion 16. The side portion 16 may comprise the first photoluminescent portion 22. In response to receiving the first emission 64 comprising the first wavelength, the first photoluminescent portion 22 may become excited and emit the third emission 28 at a first intensity. The first light source 74 may be located proximate an upper portion of the sealed housing 104. By emitting the first emission 64 from the upper portion of the sealed housing 104, the first light source 74 may cause the first photoluminescent portion 22 to emit the third emission 28 substantially from a side surface 114 and an upper surface 116 of the side portion 16. In this configuration, the first light source 74 may illuminate the side surface 114 and upper surface 116 of the side portion 16 at the first intensity.

In response the activation of the second light source 76, the second emission 78 may be emitted into the optic device 110 and substantially through the side portion 16. In response to receiving the second emission 78 comprising the first wavelength, the first photoluminescent portion 22 may become excited and emit the third emission 28 at the second intensity. The second light source 76 may be located proximate a lower portion of the sealed housing 104. By emitting the second emission 78 from the lower portion of the sealed housing 104, the second light source 76 may cause the first photoluminescent portion 22 to emit the third emission 28 substantially from the side surface 114 and a lower surface 118 of the side portion 16. In this configuration, the second light source 76 may illuminate side surface 114 and the lower surface 118 at the second intensity.

In some implementations, the first emission 78 may be emitted from the optic device 110 outward toward the ground surface 18 via a ground-emitting surface 120. The ground-emitting surface 120 may be configured to have a higher light transmissivity than the side surface 114. Similar to the side surface 114, the ground-emitting surface 120 may comprise the first photoluminescent portion 22 disposed thereon and/or dispersed therein. In this way, the ground-emitting surface 120 of the side portion 16 may be configured to emit the third emission 28 at a higher intensity relative to the light emitted through the side surface 114. As such, the lighting apparatus 14 may be operable to emit the third emission 28 to illuminate the ground surface 18 proximate the entry area 20 at a first lighting intensity or brightness. The side surface 114 and the upper surface 116 may be illuminated at a second intensity less than the first intensity.

The outer surfaces of the side portion 16 may further be coated in an at least partially light transmissive metalized finish. For example, one or more of the side surface 114, the upper surface 116, and/or the ground-emitting surface 120 may comprise a vacuum metalized coating. In this way, the side portion may have a chrome finish or any form of metallic surface finish. The side portion may be configured to have a metallic appearance when the light sources 74 and 76 are inactive, and emit the third emissions in at least one of a variety of colors when at least one of the light sources 74 or 76 is active. In some implementations, the side portion 16 may also comprise a variety of at least partially light transmissive coatings configured to achieve a desired surface finish and/or appearance for the side portion 16.

As discussed in reference to FIG. 4, the first emission 64 may be emitted at a first intensity that is lower than a second intensity of the second emission 78. The excitation of the first photoluminescent portion 22 in response to the first emission 64 and the second emission 78 may correspond to the relative intensities of the of the emissions emitted from the first light source 74 and the second light source 76, respectively. For example, the third emission 28a in response to the first light source 74 is demonstrated as the arrows having dashed lines extending from the first photoluminescent portion 22. The third emission 28b in response to the second light source 76 is demonstrated as arrows having solid lines extending from the first photoluminescent portion 22. As shown in FIG. 5, a solid lines corresponding to the second light 76 source (28b) are longer than the dashed lines corresponding to the first light source 74 (28a).

Corresponding to the higher intensity of the second emission 78 relative to the first emission 64, the third emission 28 emitted from the first photoluminescent portion 22 may be greater in response to the activation of the second light source 76 than the first light source 74. In this configuration, the lighting apparatus 12 may be operable to activate the first light source 74 in response to specific vehicle states that may require a low level of lighting emitted from the step portion 10. The lighting apparatus 12 may also be operable to activate the second light source 76 in response to vehicle states that may allow for a high level of lighting emitted from the step portion 10. In this way, the lighting apparatus 14 may be operable to illuminate the first photoluminescent portion in at least a first intensity and a second intensity corresponding to a state of the vehicle 8.

Vehicle states that may require the first intensity or a low level of lighting may include states that correspond to the vehicle 8 being in motion or operating on a roadway. Vehicle states that may allow for the second state or a high level of lighting may correspond to the vehicle 8 being parked, idle, and/or operating off a roadway. In order to determine if lighting apparatus 12 may operate at the low level or a high level, the lighting apparatus 12 may be in communication with a vehicle controller. The vehicle controller may communicate various vehicle states to the lighting apparatus 12. The vehicle states may include an ignition event, a lock actuation, a gear selection, emergency brake actuation, an interior or exterior light activation state, a presence or proximity detection of a vehicle key or key fob, and/or a signal from a remote keyless entry device. In response to one or more of the vehicle states, a controller, processor, and/or circuit of the lighting apparatus may selectively activate the first light source 74 and/or the second light source 76.

In order to control the various light sources discussed herein, the lighting apparatus may comprise a lighting controller 80 configured to selectively activate each of the light sources in response to one or more signals received from the vehicle controller. The lighting controller 80 may be in communication with the vehicle controller via any form of communication interface, for example a local interconnect buses (LIB), a controller area network (CAN), or any other wired or wireless communication interface. The lighting controller 80 may comprise one or more circuits, processors, and/or controllers configured to selectively activate the light sources in response to one or more signals received from the vehicle.

The lighting apparatus 14 may be configured to illuminate the second light source 76 at the second intensity in response to a lock actuation, a proximity detection of a vehicle key or key fob, and/or a signal from a remote keyless entry device. The second light source 76 may be activated in response to the vehicle operating or having recently been operated as identified by the ignition event in combination with the gear selection positioned in park and/or the emergency brake being active. In this configuration, the lighting apparatus 12 is operable to set a lighting intensity or level to ensure safe operation of the vehicle 8 that is compliant with various traffic regulations corresponding to various operating states of the vehicle 8.

The lighting apparatus 12 may be configured to illuminate the first light source 74 at the first intensity in response to the vehicle lights being active, the gear selection positioned in a drive gear, the vehicle ignition operating, etc. In response to receiving a signal corresponding to at least these states of the vehicle 8, the lighting apparatus may be operable to selectively activate the first light source 74 and/or the second light source to emit the third emission 28 at the first intensity or the second intensity. In some implementations, both of the light sources 74 and 76 may be activated to emit the third emission 28 at a third intensity that is greater than the first intensity or the second intensity.

As discussed herein, the lighting apparatus 12 may further comprise a second photoluminescent portion 32 corresponding to the graphic 30 disposed on the side portion 16. The second photoluminescent portion 32 may be activated by the first emission 64 and/or the second emission 78 similar to the first photoluminescent portion 22. In response to the first wavelength received from the first emission 64 and/or the second emission 78, the second photoluminescent portion 32 may illuminate in the second color 90. The photoluminescent material utilized to generate the first color 88 and the second color 90 may have substantially similar light absorption ranges such that the photoluminescent portions 22 and 32 may be excited by the first wavelength.

As discussed herein, the first color 88 and the second color 90 may correspond to the first photoluminescent portion 22 and the second photoluminescent portion 32, respectively. In this configuration, photoluminescent materials for the first photoluminescent portion 22 and the second photoluminescent portion 32 may be selected based on the specific lighting and color properties desired for each of the photoluminescent portions. In this way, the lighting apparatus 12 may further illuminate the second photoluminescent portion 32 by converting the first wavelength of the first and/or second emissions 64, 78 to the fourth emission 34 to illuminate the side portion 16 in the first color 88 and the graphic 30 in the second color 90.

Figure 6:
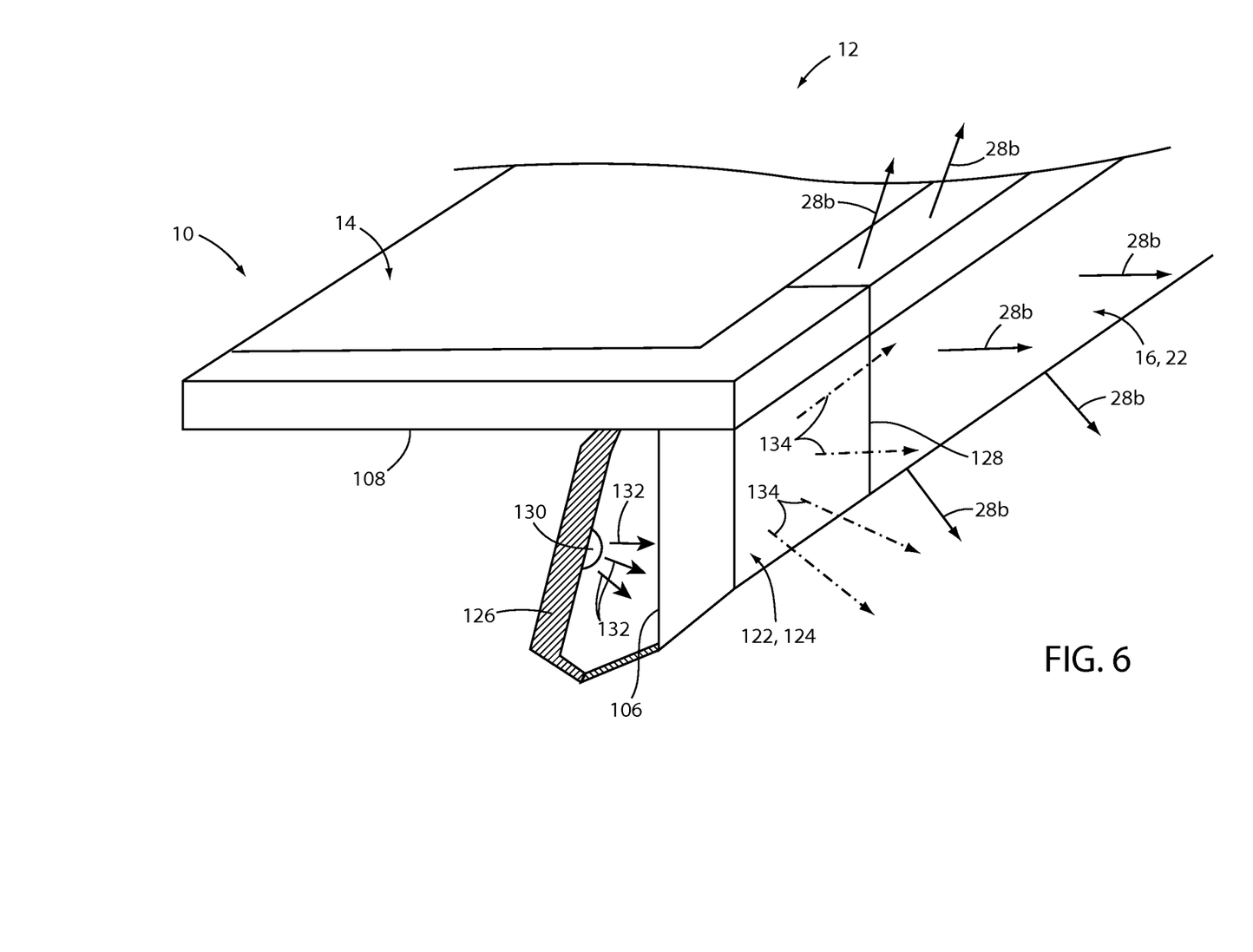
FIG. 6 is a perspective cross-sectional view of a step portion of a vehicle comprising a lighting apparatus configured to output a turn indicator.

Referring now to FIG. 6, a perspective cross-sectional view of the lighting apparatus 12 is shown demonstrating a turn indicator 122. The step portion 10 is shown comprising the step surface 14 and the side portion 16. Similar to FIG. 5, the first photoluminescent portion 22 is shown corresponding to the side portion 16. The signal indicator 122 may correspond to a third photoluminescent portion 124 that may be implemented alone and/or in combination with either of the first photoluminescent portion 22 and the second portion 32. In some implementations, the first photoluminescent portion 22, the second photoluminescent portion 32, and the third photoluminescent portion 124 may all be implemented in the lighting apparatus 12. To demonstrate such a combination, the first photoluminescent portion 22 is shown emitting the third emission 28b in response to receiving the second emission 78.

The turn indicator 122 may be disposed proximate a side portion 16 and in a sealed signal housing 126 similar to the sealed housing 104. The sealed housing 126 may being partitioned from the sealed housing 104 by a non-light transmissive partition 128. The third photoluminescent portion 124 may be disposed in an at least partially light transmissive material of the signal indicator 122 and/or applied as a coating thereto. In this configuration, the lighting apparatus 12 may selectively illuminate the first photoluminescent portion 22 and the turn indicator 122 independently.

A third light source 130 may be disposed in the sealed signal housing 126 and configured to emit a fifth emission 132. The fifth emission 32 may comprise the first wavelength or any other wavelength to excite the third photoluminescent portion 124. In response receiving the fifth emission 132 the third photoluminescent portion 124 may become excited and emit a sixth emission 134. The third photoluminescent portion 124 may comprise one or more photoluminescent materials configured to convert the fifth emission 132 to generate the sixth emission 134 comprising wavelengths of light corresponding to a substantially orange, yellow, red color, and/or any other color. In this configuration, the lighting apparatus 12 may be operable to selectively activate the third light source 130 to illuminate the third photoluminescent portion 124 in response to a turn signal of the vehicle 8 being activated.

The lighting apparatus 12 described herein may provide for effective and affordable lighting to illuminate a step portion of a vehicle. The lighting apparatus 12 may be configured to emit utility light and/or decorative lighting from any of a plurality of photoluminescent portions to meet a desired lighting design. Though the apparatus disclosed herein is described in detail in reference to a running board or step portion of a vehicle, those skilled in the art will acknowledge that the disclosure may be applied to in a variety of implementations without departing from the spirit of the disclosure.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue. It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An illumination apparatus for a vehicle comprising:
    a photoluminescent portion disposed on a step portion;
    a first light source configured to excite the photoluminescent portion in a back-lit configuration;
    an optic device on the step portion and configured to direct light from the first light source to illuminate a step surface and a ground surface proximate the vehicle; and
    a lighting controller configured to selectively activate the first light source via a communication signal, and configured to selectively activate the first light source.

2. The illumination apparatus according to claim 1, further comprising a second light source configured to illuminate the photoluminescent portion.

3. The illumination apparatus according to claim 2, wherein the first fight source and the second light source are configured to illuminate a ground surface proximate an entry area of the vehicle.

4. The illumination apparatus according to claim 2, wherein the first light source is configured to illuminate the photoluminescent portion at a first intensity and the second light source is configured to illuminate the photoluminescent portion at a second intensity less than the first intensity.

5. The illumination apparatus according to claim 2, wherein the optic device is disposed proximate the step portion and configured to transmit light from at least one of the first light source and the second light source longitudinally along the step portion.

6. The illumination apparatus according to claim 5, wherein the controller is further configured to selectively activate each of the first light source and the second light source in response to a state of the vehicle.

7. The illumination apparatus according to claim 5, wherein the controller is operable to selectively activate the first light source in response to the vehicle being in motion and the second light source in response to the vehicle being parked.

8. The illumination apparatus according to claim 1, wherein the photoluminescent portion extends substantially along a longitudinal dimension of at least one door of the vehicle.

9. The illumination apparatus according to claim 1, wherein the first light source and the second light source are disposed in a housing coupled to an inner surface of the side portion and the first light source is positioned above the second light source in the housing.

10. An illumination apparatus for a vehicle comprising:
    a step portion comprising a step surface and a side portion;
    an illumination device extending longitudinally along the side portion;
    a controller configured to activate a first light source and a second light source disposed behind the side portion; and
    an optic device on the step portion configured to direct light from the first light source and the second light source to illuminate the step surface and a ground surface.

11. The illumination apparatus according to claim 10, wherein the illumination device comprises at least one photoluminescent material configured to emit the light to illuminate the lighting apparatus.

12. The illumination apparatus according to claim 11, wherein the first light source and the second light source are disposed in a housing coupled to an inner surface of the side portion.

13. The illumination apparatus according to claim 12, wherein the controller is operable to selectively activate each of the first light source and the second light source to illuminate the portion of the step surface at a first intensity and the ground surface at a second intensity.

14. The illumination apparatus according to claim 13, wherein the first light source and the second light source are configured to emit emissions of light configured to excite the photoluminescent material.

15. The illumination apparatus according to claim 14, wherein the side portion comprises an at least partially light transmissive material configured to allow the emissions of light to pass through to the side portion to excite the photoluminescent material.

16. The illumination apparatus according to claim 10, wherein the first light source is positioned in closer proximity to the step surface than the second light source.

17. An illumination apparatus for a vehicle comprising:

a step portion comprising a step surface and a side portion;

a first photoluminescent portion disposed on an inner surface of and extending along a longitudinal dimension of the side portion;

a second photoluminescent portion corresponding to a graphic disposed on the side portion;

a first light source configured to emit light at a first wavelength to excite the photoluminescent portions; and a lighting controller in communication with the first light source and operable to selectively activate the light source.

18. The illumination apparatus according to claim 17, wherein the first photoluminescent portion is configured to illuminate a portion of the step surface in response to receiving the first wavelength.

19. The illumination apparatus according to claim 18, wherein the first photoluminescent portion is configured to emit a first color of light and the second photoluminescent portion is configured to emit a second color different from the first color in response to receiving the first wavelength of light.

20. The illumination apparatus according to claim 9, wherein the housing forms a sealed assembly in connection with an optic device and containing the first light source and the second light source.

* * * * *

UNITED STATES PATENT AND TRADEMARK OFFICE
CERTIFICATE OF CORRECTION

PATENT NO. : 9,487,127 B2  
APPLICATION NO. : 14/490738  
DATED : November 8, 2016  
INVENTOR(S) : Stuart C. Salter et al.

Page 1 of 1

It is certified that error appears in the above-identified patent and that said Letters Patent is hereby corrected as shown below:

In the Claims

Column 14,  
Claim 1, Lines 15-16:  
After "signal" delete ", and configured to selectively activate the first light source".

Claim 3, Line 21:  
"fight" should be --light--.

Column 16,  
Claim 17, Line 6:  
After "to" delete "emit light at".

Signed and Sealed this  
Fourteenth Day of March, 2017

Michelle K. Lee  
*Director of the United States Patent and Trademark Office*